United States Patent
Nellikar et al.

(10) Patent No.: US 9,380,025 B2
(45) Date of Patent: Jun. 28, 2016

(54) METHOD AND APPARATUS FOR INGRESS FILTERING

(71) Applicant: CISCO TECHNOLOGY, INC., San Jose, CA (US)

(72) Inventors: Suraj Nellikar, Santa Clara, CA (US); Maithili Narasimha, Sunnyvale, CA (US)

(73) Assignee: CISCO TECHNOLOGY, INC., San Jose, CA (US)

(*) Notice: Subject to any disclaimer, the term of this patent is extended or adjusted under 35 U.S.C. 154(b) by 190 days.

(21) Appl. No.: 13/935,314

(22) Filed: Jul. 3, 2013

(65) Prior Publication Data
US 2015/0012998 A1 Jan. 8, 2015

(51) Int. Cl.
*G06F 9/00* (2006.01)
*G06F 15/16* (2006.01)
*G06F 17/00* (2006.01)
*H04L 29/06* (2006.01)
*H04L 12/931* (2013.01)

(52) U.S. Cl.
CPC .......... *H04L 63/0245* (2013.01); *H04L 49/356* (2013.01); *H04L 63/20* (2013.01); *H04L 49/70* (2013.01); *H04L 63/101* (2013.01); *H04L 63/102* (2013.01); *H04L 63/108* (2013.01); *H04L 63/1408* (2013.01); *H04L 63/162* (2013.01)

(58) Field of Classification Search
CPC ......... H04L 41/28; H04L 63/00; H04L 63/02; H04L 63/0227–63/0263; H04L 63/029; H04L 63/10; H04L 63/14–63/1425
See application file for complete search history.

(56) References Cited

U.S. PATENT DOCUMENTS

| | | | | |
|---|---|---|---|---|
| 7,827,402 B2* | 11/2010 | Smith | ............ | H04L 63/105 713/151 |
| 8,291,108 B2* | 10/2012 | Raja et al. | ............ | 709/238 |
| 2010/0214949 A1* | 8/2010 | Smith | ............ | H04L 45/586 370/254 |
| 2013/0070762 A1* | 3/2013 | Adams | ............ | H04L 49/70 370/389 |
| 2014/0115654 A1* | 4/2014 | Rogers et al. | ............ | 726/1 |

* cited by examiner

*Primary Examiner* — Daniel Potratz
(74) *Attorney, Agent, or Firm* — Patent Capital Group

(57) ABSTRACT

An example method is provided and, in an example embodiment, includes receiving a data packet at an ingress switch function, the data packet associated with a data packet flow; obtaining access control information associated with a destination of the data packet flow from a centralized service engine; and performing access filtering on the data packet flow at the ingress switch function using the access control information.

18 Claims, 6 Drawing Sheets

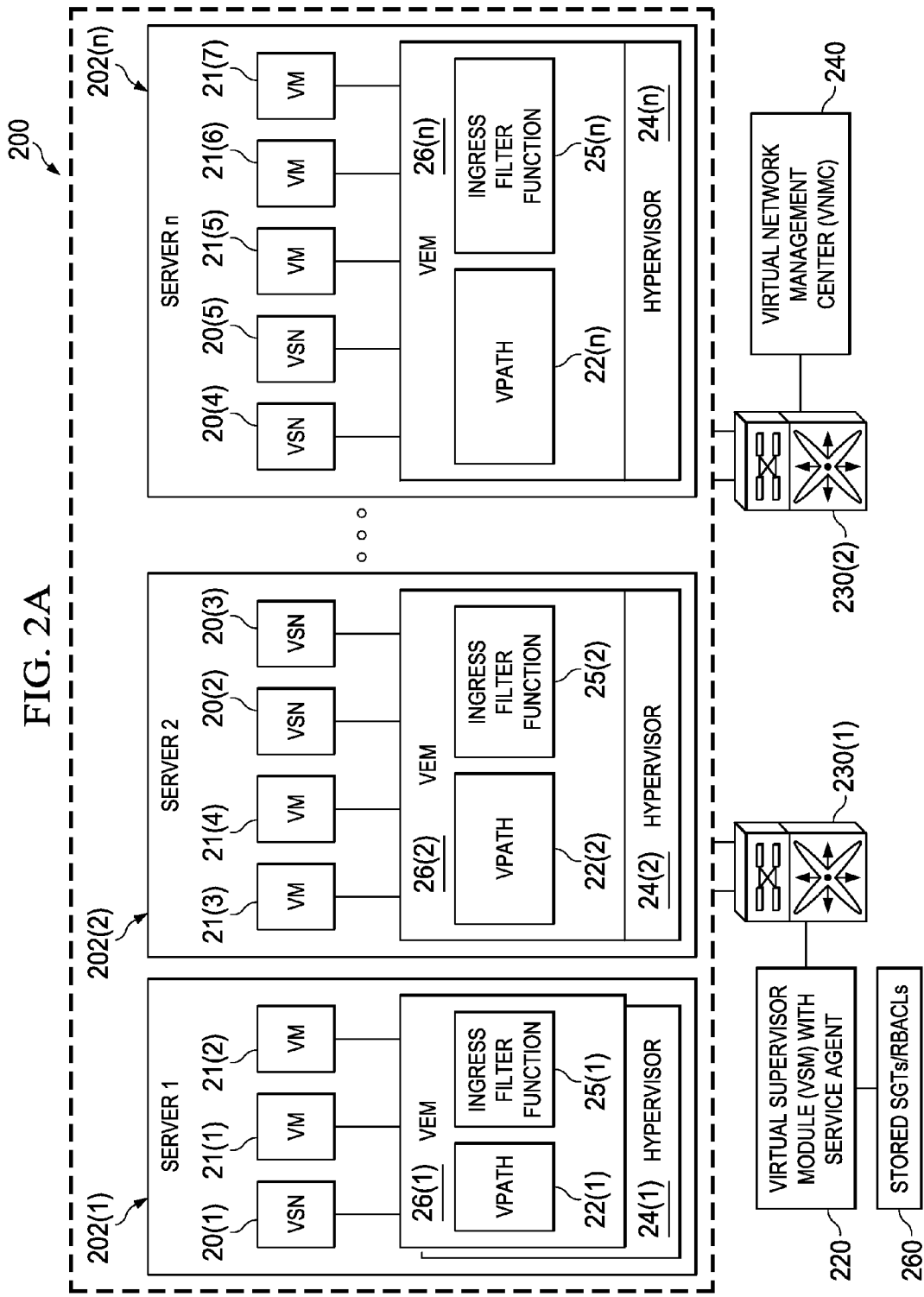

METHOD AND APPARATUS FOR INGRESS FILTERING

TECHNICAL FIELD

This disclosure relates in general to communication networks and, more particularly, to a method and apparatus for achieving ingress filtering in a communication network.

BACKGROUND

A secure communication network may be implemented by authenticating, authorizing and enforcing access control on end hosts. In implementing a secure communication network end hosts may each be associated with a security group tag (SGT). Access control may be enforced using role based access control lists (RBACLs) that are based on the source host's and the destination host's SGTs. The access control is usually applied at the egress (exit point) of the network through egress filtering. Access control applied at the egress may not be efficient because data packets that may eventually get dropped by access control at the egress will flow through the entire network. This unnecessary data packet flow through the network could take up valuable bandwidth that could be utilized for other data traffic.

One approach to solve the problem of unnecessary traffic flow through the network caused by filtering at the egress is to enforce RBACLs and filter at the ingress (entry point) of the network. However, storing SGTs and RBACLs for all possible destination hosts on all first-hop ingress switches is difficult to administer and maintain. It would therefore provide an advantage to have an efficient solution for ingress filtering that was easy to administer and maintain in a communications network.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 2A is a simplified block diagram illustrating example details of a system in accordance with an embodiment of the disclosure;

DETAILED DESCRIPTION OF EXAMPLE EMBODIMENTS

Overview

An example method is provided and, in an example embodiment, includes receiving a data packet at an ingress switch function, the data packet associated with a data packet flow; obtaining access control information associated with a destination of the data packet flow from a centralized service engine; and performing access filtering on the data packet flow at the ingress switch function using the access control information.

In an example embodiment of the method and apparatus, an access control is enforced at the ingress of a network on a data packet flow using ingress filtering based on access control information associated with the destination of the data packet flow. In one embodiment, a centralized services engine maintains access control information for destinations within a network. When the first packet of a data flow is received in a network at an ingress switch function, the ingress switch may obtain access control information associated with the data packet flow from the centralized services engine and perform ingress filtering based on the access control information. The ingress switch may obtain the access control information, for example, by forwarding the first data packet to the centralized services engine. The centralized services engine may then determine the access control information associated with the destination of the data packet flow and downloads the access control information to the ingress switch function. The ingress switch function may then perform ingress filtering based on the access control information.

The term ingress switch or ingress switching function is used in this disclosure as encompassing any ingress point in a network where packets may be received, switched, routed, processed, etc. Also, as used in this disclosure the term ingress filtering or performing ingress filtering may include performing any type of access control performed at the ingress or entry point of a network. This may include determining whether or not, or under what conditions, security or otherwise, data packets of the data packet flow are to be sent through a network to the indicated destination of the data packet flow and, then denying, accepting, or allowing the data packets to be sent or not, depending on the conditions. Centralized service engine refers to any hardware/software, server or virtual machine that is configured to store and/or maintain access control information and that may interact with an ingress switch performing ingress filtering. Access control information as used means any type of information that may be used for performing access filtering.

Example Embodiments

Figure 1:
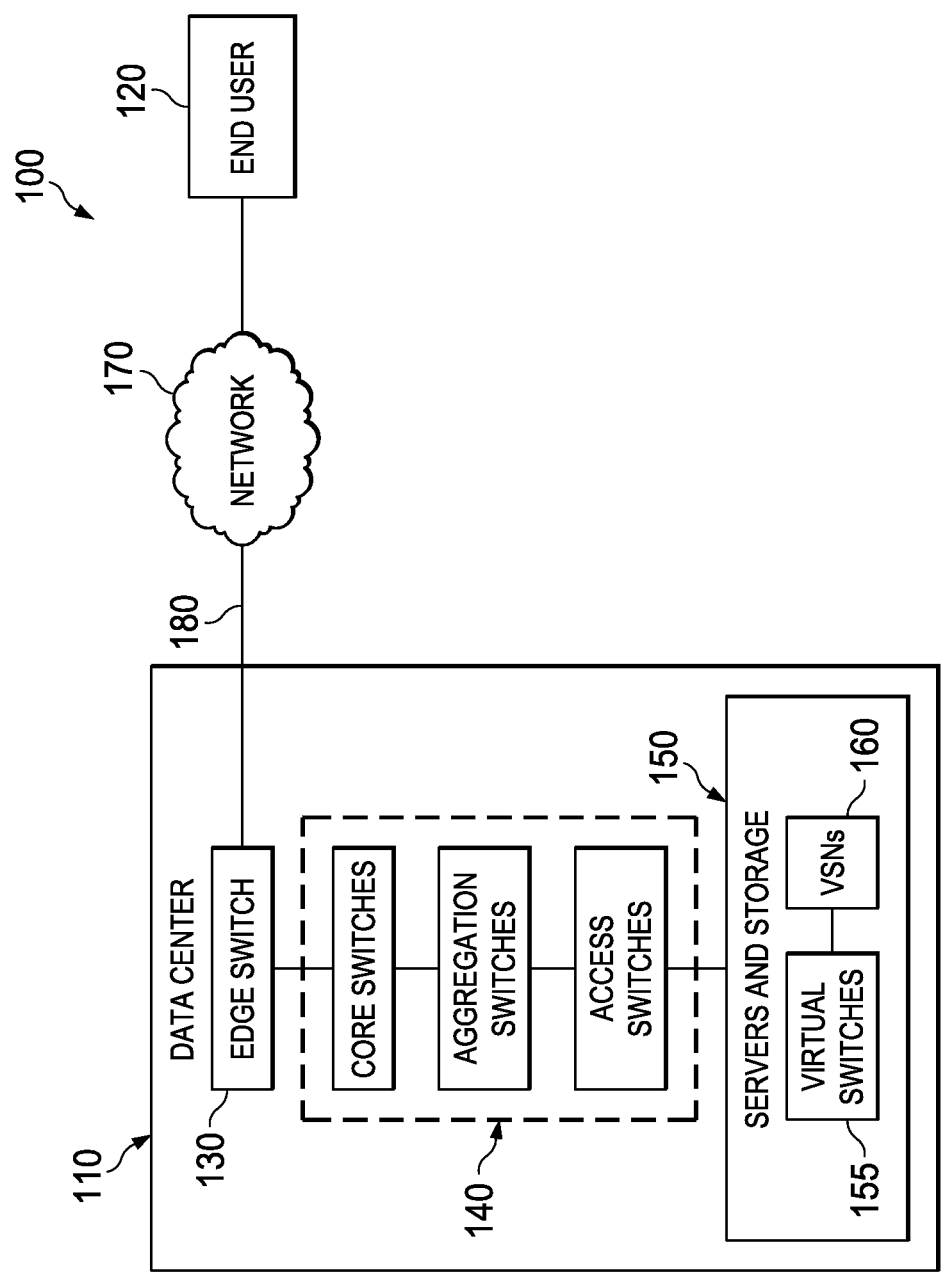
FIG. 1 is a simplified block diagram illustrating an example network into which an embodiment of the disclosure may be implemented.

Referring now to FIG. 1, an example system is shown for a data center and end user environment. System 100 comprises a data center 110 an End User 120, e.g., another data center, other networks, or individual users. The data center 110 and End User 120 communicate with each other by way of links 180 over public network 170. The data center 110 employs one or more edge switches 130 for traffic ingressing or egressing the data center. The data center 110 also comprises a plurality of servers and storage devices 150. The servers (e.g., blade servers) may host application services (e.g., World Wide Web center applications, remotely hosted virtual machine (VM) applications, etc.). The storage devices may be part of a storage area network (SAN).

The data center 110 further comprises core switches, aggregator switches and access switches, collectively shown at reference numeral 140, to aggregate and distribute ingress (upstream traffic) and egress (downstream traffic). A plurality of switches is provided at each access, aggregation, and core level to achieve redundancy within the data center 110. In this example, the plurality of servers and storage devices 150 employ a plurality of virtual switches 155 and a plurality of virtual service nodes (VSNs) 160 to service network traffic for VMs operating therewith. Typical services provided for network traffic may consist of load balancing and applications control, WAN acceleration, network security, and network analysis and monitoring. WAN acceleration typically involves application and data acceleration, e.g., using compression techniques to reduce hardware throughput requirements. According to the techniques provided herein, ingress filtering may be implemented into selected virtual switches of the virtual switches 155 that act as ingress points for traffic entering the data center 110 through the switches 140 and edge switch 130. The virtual switches may interact with a centralized services engine to implement the ingress filtering. That is, data traffic entering data center 110 will be filtered upon entry into the network controlled by the data center 110 at the virtual switch serving as the ingress point of the data traffic.

Referring now to FIG. 2A, therein is a simplified block diagram illustrating example details of a portion of the system of FIG. 1 in accordance with one embodiment of the disclosure. FIG. 2A illustrates an example network 200 that could be implemented as, for example, data center 110. The environment comprises a virtual supervisor module (VSM) 220, having stored security group tags and associated "role based control access lists" (SGT/RBACLs) 260 for VMs under its control, switches 230(1) and 230(2), a virtual network management center (VNMC) 240, and a plurality of servers 202(1)-202(n). Each server 210(1)-210(n) hosts a hypervisor 24(1)-24(n), respectively. As used herein, the value n represents any quantity of items referred to and may vary from item to item. Hypervisors are hardware abstract layers that provide operating system independence for application services provided by VMs. Hypervisor 24(1) supports VSN 20(1), and VMs 21(1) and 21(2), hypervisor 26(2) supports VSNs 20(2) and 20(3), and VMs 21(3) and 21(4), and hypervisor 26(n) supports VSNs 20(4) and 20(5), and VMs 21(5)-21(7). VMs 21(1)-21(7) may provide applications and services, e.g. one or more private networks in a private cloud for end users, for example, end user 120(FIG. 1). Each hypervisor 24(1)-24(n) has a virtual switch or Virtual Ethernet Module (VEM, shown as VEMs 26(1)-26(n) that includes an Ingress Filtering Function 25(1)-25(n). VEMs 26(1)-26(n) perform switching at layer 2 of the Open Systems Interconnect (OSI) model. The VEMs 26(1)-26(n) also perform some Quality of Service (Qos), security and monitoring functions. Each hypervisor 24(1)-24(n) also has a virtual service data path (VPATH) 22(1)-22(n), respectively.

VEMs 26(1)-26(n) provide switching and other services for VMs 21(1)-21(7), e.g., VM routing and switching for VM ingress and egress network traffic. VEMs 26(1)-26(n) also provide ingress network filtering for VSN 22(1)-22(5). VPATHs 22(1)-22(n) provide a dedicated traffic pathway for services provided by VSN 22(1)-22(5) to VMs 21(1)-21(7). The VPATHs 22(1)-22(n) may be in the form of a service overlay path, e.g., a layer 2/3 overlay tunnel. The VPATHs 22(1)-22(n) also give the VSNs mobility that allows them to migrate from one server to another without routing traffic through an inline appliance. By use of a VEM and VPATH architecture, any of the VSNs 20(1)-20(5) may provide services for any of the VMs 21(1)-21(7). Accordingly, when a VM mobility event occurs, e.g. if a VM is moved from one server to another, VSNs that were providing network traffic services for the moved VM will also provide those same services when the VM that has been moved is running on its new server.

VSM 220 allows a network team to manage the virtualization environment and to manage network policies by way of port profiles. The VSM 220 employs a service agent (SA) to facilitate the functions of the VSM 220. The VNMC 240 is used by a security/server team to manage the various VMs, security policies and VSNs, e.g., virtual firewalls using service profile that encompasses security policies. For ease of use, VNMC 240 provides a graphical user interface (GUI) for device and policy management. VSM 220 and VNMC 240 may also be adapted as necessary to allow implementation of the centralized security engine that is utilized in ingress filtering according to the present disclosure.

Figure 2B:
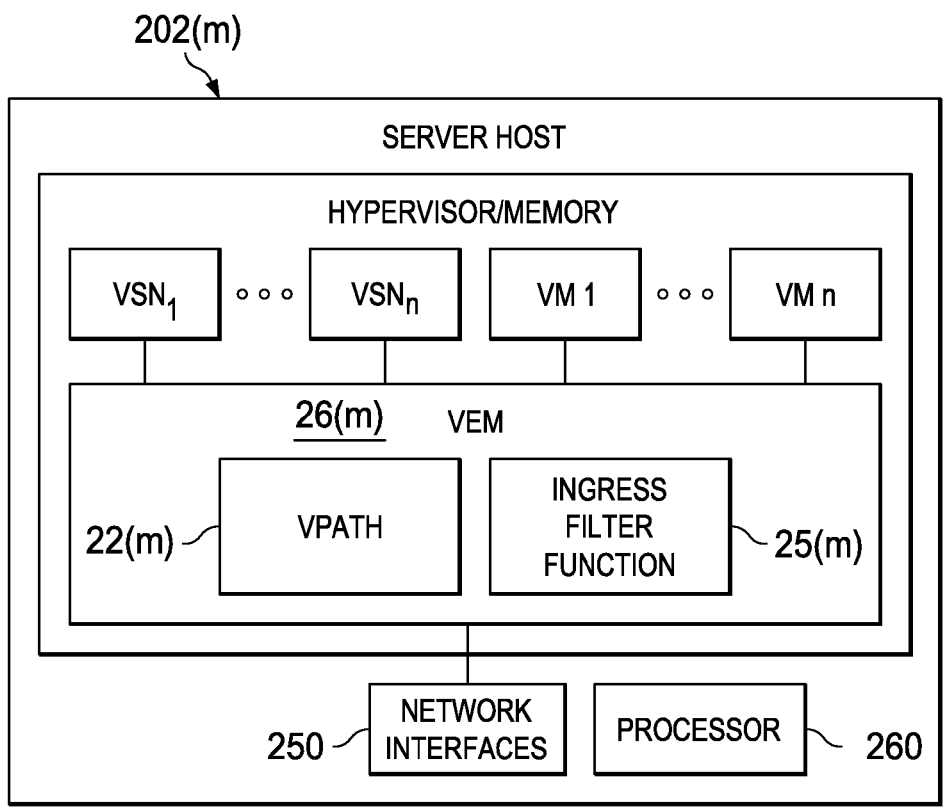
FIG. 2B is a simplified block diagrams illustrating example details of a server host in accordance with an embodiment of the disclosure.

Referring now to FIG. 2B, therein is a simplified block diagram illustrating example functions of a server host 202(*m*) in accordance with an embodiment of the disclosure. Server host 202(*m*) may, for example, represent a server host that may be implemented in FIG. 2A. For example, servers 202(1) through 202(n) may be implemented in a similar manner. The server 202(*m*) comprises one or more network interface units 250, a processor 260, and a hypervisor 24(*m*) with memory for storage. The network interface units 250 are coupled to the processor 260 and are configured to transmit or receive messages over one or more networks or between servers. Additionally, the network interface units 250 are configured to support the VEM 26(*m*) and VPATH 22(*m*) across multiple servers, according to the techniques described herein. VEM 26(*m*) provides the ingress filter function 25(*m*) that functions to provide ingress filtering according to the embodiments of the disclosure. Server host 202(*m*) may be configured to provide multiple VSNs(VSN1-VSNn) and VMs(VM1-VMn).

Processor 260 is coupled to the network interface units 250 and to the hypervisor 24(*m*). Processor 260 is a microprocessor or microcontroller that is, for example, configured to execute program logic instructions (i.e., software) for carrying out various operations and tasks described herein. Processor 260 may be configured with memory or other storage. Hypervisor 24(*m*) is also configured with one or more processors similar to processor 260 and may be referred to herein generally as "processors". Memory used in server 202(*m*) may comprise read only memory (ROM), random access memory (RAM), magnetic disk storage devices, optical storage media devices, flash memory devices, electrical, optical or other physical/tangible memory storage devices.

The functions of the processors may be implemented by logic encoded in one or more tangible computer (non-transitory) readable storage media (e.g., embedded logic such as an application specific integrated circuit (ASIC), digital signal processor (DSP) instructions, software that is executed by a processor, etc.), where memory stores data used for the operations described herein and stores software or processor executable instructions that are executed to carry out the operations described herein. The various functions and components of the embodiments may take any of a variety of forms, so as to be encoded in one or more tangible readable memory media or storage device for execution, such as fixed logic or programmable logic. (e.g., software/computer instructions executed by a processor) and the processors may be ASICs that comprises fixed digital logic, or a combination thereof. For example, the processors may be embodied by digital logic gates in a fixed or programmable digital logic integrated circuit, which digital logic gates are configured to perform various functions described herein. In general, the components may be embodied in one or more computer readable storage media encoded with software comprising computer executable instructions and when the software is executed operable to perform the operations described herein.

In an embodiment, the access control information may include security group identifier information that may be implemented using security group tags (SGTs). Security groups may be associated with access control lists which may be implemented as role based access control lists (RBACLs). The centralized services engine may determine the destination SGT/RBACL information from the data packet of the flow and down load the SGT/RBACL information to the ingress switch function. The ingress switch function then may use the SGT/RBACL information to enforce ingress filtering and access control on the data packet flow.

In one embodiment of FIG. 2A, ingress filtering is performed by using the source and destination SGT, and RBACL rules associated with the destination SGT. The SGTs identify security groups. Security groups may be groups to which network entities (hosts, servers, internet protocol (IP) devices and the like) are assigned. The network entities may be assigned to a specific security group for the purpose of access control decisions based on roles within an organization and network. A security group may be associated with a role or more than one role. The RBACLs implement network security policy and are applied to determine if entities in the network are allowed to communicate and how a data packet sourced from a given entity is to be handled. When a data packet is received at the network ingress, information on the data packets source security group may be inserted into the data packet. The information may be communicated in a number of ways. This may be as a SGT that is inserted into or associated with the packet in some other way. Access filtering using application of the RBACLs may comprise one or more operations. This may include source and destination SGT determination, permission determination and permissions enforcement, etc.

In the example implementation of the embodiment, the method and apparatus may be implemented in a network having a distributed virtual access layer switch implementing virtual machines controlled by a virtual supervisor module. The distributed virtual access layer switch may be implemented using one or more virtual Ethernet modules that each provides the switch function for one or more of the virtual machines of the network. The virtual supervisor module may maintain security group tags and role based access control list information for virtual machines within the distributed access layer switch under its control to provide a centralized service engine. When the first packet of a data flow is received in a network at an ingress switch function, the ingress switch obtains access control information associated with the data packet flow from the virtual supervisor module and performs ingress filtering based on the access control information. The ingress switch may obtain the access control information by forwarding the first data packet to the virtual supervisor module. The virtual supervisor module then determines the destination security group tag and the role based access control list policy associated with the destination security group tag and down loads it to the ingress virtual Ethernet module. The ingress virtual Ethernet module may then use the security group tag and role based access control list policy information to enforce ingress filtering at the virtual Ethernet module on the data packet flow. In the example implementation the virtual supervisor module may maintain security group tags and role based access control list information, for example, by running the Security Group Exchange Protocol (SXP) protocol on virtual machines under its control. SXP is a control protocol for propagating IP→SGT binding information across network devices that do not have capability to tag packets. The SXP protocol is primarily used to pass IP→SGT bindings from authentication points (e.g. access layer switches) to upstream devices in the network. This allows security services on switches (e.g. cat6k, Nx7K, etc.) or routers (e.g. ISRs, etc.,) to learn identity information from access switches (e.g. Cat3K) enabling enterprises to easily incorporate identity awareness and make it pervasive across the enterprise, without the need for hardware upgrades or changes. In alternative implementations, any other suitable method or protocol for maintaining the security group tags and role based access control list information may be used. In the example embodiment security group tag and role based access control list policy information that has been downloaded to an ingress switch function may be aged out to prevent the information from becoming stale. This may be done by maintaining an active timer when ingress filtering is active on a data packet flow to age the entries out.

Referring again to FIG. 2A, Network 200 maintains the source SGTs for the VMs on the DVS using the 802.1x/port profile configuration. The destination SGTs and associated RBACLs may be downloaded from VSM 220. VSM 220 maintains all the SGTs and updated RBACLs for network 200 in database 260. VSM 220 may maintain the SGTs and RBACLs by running the security group exchange protocol (SXP) protocol for VM destinations within the system 200. The first packet in a data packet flow received at an ingress VEM may be forwarded to VSM 220. VSM 220 determines the destination SGT and the policy associated with the flow and downloads the SGT and policy to the ingress VEM. The ingress VEM then may use the downloaded information to enforce ingress filtering on future packets in the flow. This reduces latency by avoiding sending all of the packets in the flow to the VSM. Although embodiment of FIG. 2A is illustrated using the example of an ingress VEM in network 200 forwarding the first data packet in a data flow to the VSM to obtain destination SGT/RBACL information, any other method that exchanges signals or queries between an ingress VEM and the centralized service function may be used to obtain the access control information in alternative implementations.

Ingress filtering provides advantages as compared to present methods of filtering that are performed at an egress of a system, such as system 200, when a data packet of a flow has a destination that require it to exit the system at the egress. The ingress filtering prevents data packets that would eventually get dropped at the egress with egress filtering from flowing through the entire network. This prevents such a data packet from traversing the whole system and taking up valuable bandwidth and improves network bandwidth. Additionally, ingress filtering done in a distributed manner at multiple ingress switching functions is less intensive as far as demands on processing power as compared to egress filtering performed on a single switch. Ingress filtering according to the embodiments of this disclosure also prevents the need to store SGTs in each virtual switch of a network, such as VEMs 26(1)-26(n) of network 200 by utilizing the centralized services engine (e.g., VSM) to store the SGTs.

Figure 3A:
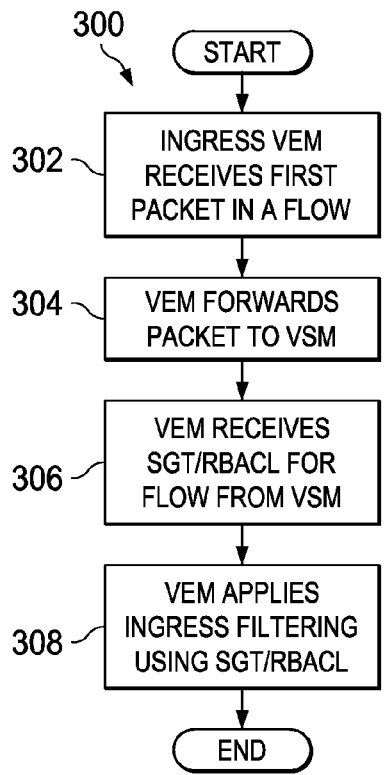
FIGS. 3A and 3B are simplified flow diagrams illustrating example operations that may be associated with a process in an ingress section of a system in accordance with an embodiment of the disclosure.

Referring now to FIG. 3A, therein is a simplified flow diagram 300 illustrating example operations that may be associated with a process in an ingress section of a system in accordance with an embodiment of the disclosure. FIG. 3A illustrates example processing operations that may be performed during ingress filtering in a network implemented according to the embodiment of FIG. 2A. The operations of FIG. 3A are performed by an ingress VEM that may receive data traffic originating outside of the system 200. FIG. 3A illustrates a process for ingress filtering when the ingress filtering services control node is implemented in the VSM of the system, here VSM 220. The ingress VEM may be any of the VEMs 26(1)-26(n) of network 200 that may receive data packet traffic as an ingress of system 200. VEM 26(1) will be used as an example ingress VEM here to illustrate the process of FIG. 3A. The process begins at 302 when the first data packet of a new data traffic flow is received at ingress VEM 26(1). After receiving the first data packet VEM 26(1) obtains access control information on the destination of the data packet flow. VEM does this by forwarding, at 304, the first data packet of the flow to VSM 220. VSM 220 receives the first packet in the data traffic flow with its source and destination IP addresses, determines the SGT of the source, determines the destination SGT from the VSM databases, and then determines the RBACL for destination SGT. VSM 220 then sends the SGT/RBACL information back to VEM 26(1). At 306 VEM 26(1) receives the SGT/RBACL information for the new data traffic flow from VSM 220. At 308 VEM 26(1) applies ingress filtering to data packets of the new data traffic flow using the SGT/RBACL information received from the VSM 220.

Figure 3B:
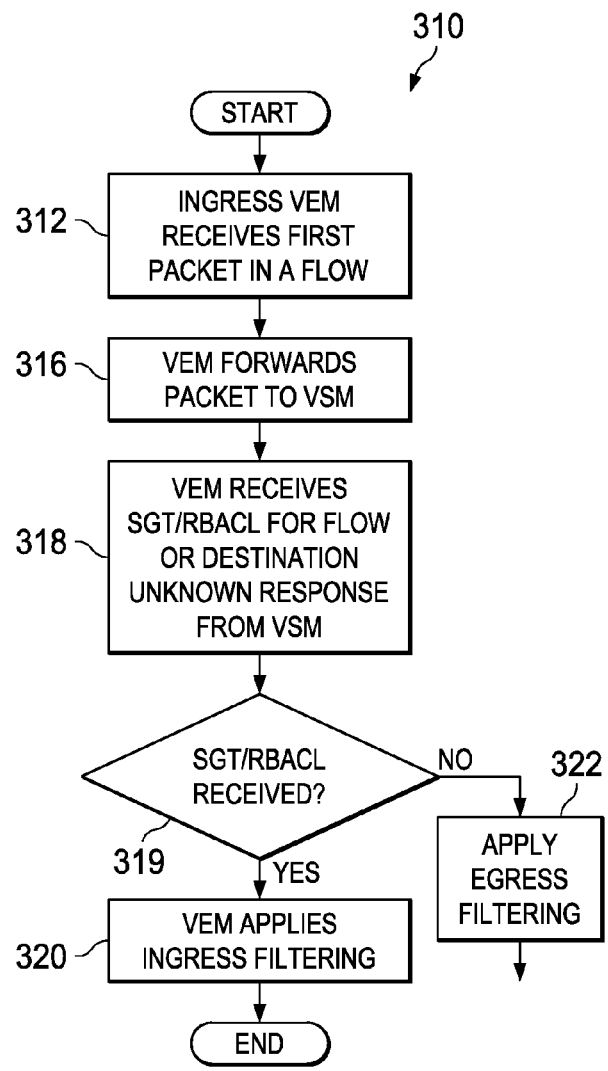
Figure 4:
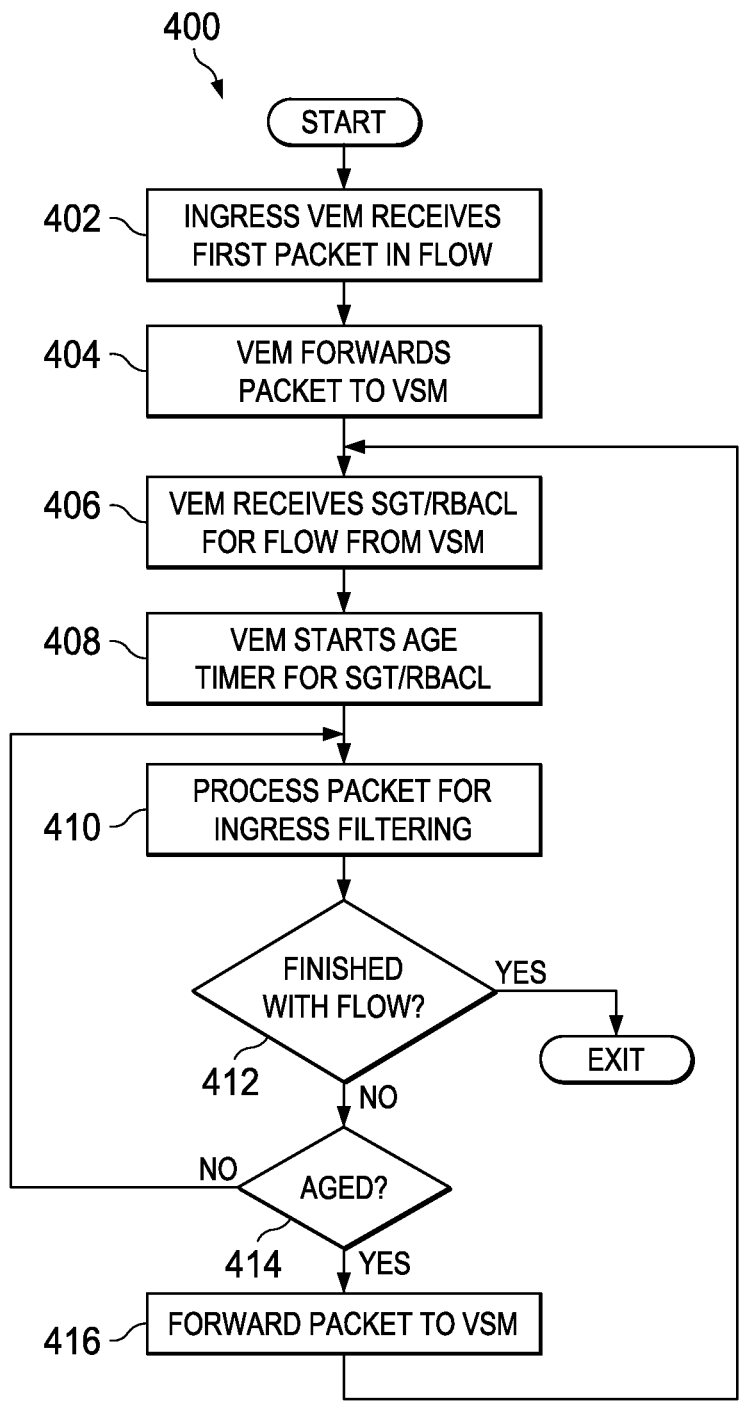
FIG. 4 is a simplified flow diagram illustrating example operations that may be associated with a process in an ingress section of a system in accordance with an embodiment of the disclosure.

Referring now to FIG. 4, therein is a simplified flow diagram illustrating example operations that may be associated with a process in an ingress section of a system in accordance with an embodiment of the disclosure. FIG. 4 shows example operations performed by the VEM including example details of operation 308 of FIG. 3. The process of FIG. 4 begins at 402 where the first packet of a new data flow is received at ingress VEM 26(1). Operations 402, 404 and 406 of FIG. 4A are essentially the same as 302, 304, and 306, respectively, of FIG. 3A. At 408, VEM 26(1) has received the SGT/RBACL information from VSM 220. At 408 VEM 26(1) initiates (e.g., starts, triggers, etc.) an "age" timer. The age timer may run for a predetermined period of time while the packets of data packet flow are being filtered. The purpose of the age timer is to ensure that the SGT/RBACL information for the current data packet flow does not become stale. The expiration of the age timer will cause VEM 26(1) to refresh the SGT/RBACL information for the data packet flow being processed. At 410 VEM processes a data packet of the data packet flow and applies ingress filtering to the data packet of the data packet flow based on the RBACL rules for the source and destination SGTs. At 412 VEM 26(1) determines if the ingress filtering process for the data packet flow is finished. If the ingress filtering process for the data packet flow is finished the process exits from 412 and ends. If the ingress filtering process for the data packet flow is not finished, at 414 VEM 26(1) determines if the age timer is expired. If it is determined at 414 that the age timer is not expired, at 410 VEM 26(1) performs ingress filtering on the next data packet of the data packet flow based on the RBACL rules for the source and destination. From 410 the process continues again to 412. If, however, at 414 it is determined that the age timer has expired the process moves to 416. At 416 VEM 26(1) forwards a next data packet of the data packet flow to VSM 220. The process then moves from 416 to 406 and the ingress filtering process for data packets of the data packet flow continues through 406, 408, 412, 414 and 416 until the ingress filtering is completed for the data packet flow.

Additionally, in an alternative implementation, an inactive timer may be used when ingress filtering has become inactive for a data packet flow to age the entries out. Expiration of the active timer may cause the ingress switching function to resend a data packet of the flow to the centralized service function in order to receive the security group tag and role based access control list policy information again. Expiration of the inactive timer may be used to cause the ingress switching function to purge the security group tag and role based access control list policy information associated with a data traffic flow from storage in the ingress switching function.

In an embodiment, ingress filtering may be implemented in a co-existing manner with egress filtering. This has advantage, for example, in a cloud based multi-tenant service provider environment and in highly scalable enterprise data centers. For example, co-existing ingress and egress filtering may be implemented in a system where there is a single distributed virtual switch (DVS) acting as an access layer switch and where a large number of VMs are controlled by a single VSM in the DVS. In this implementation, since the VSM is already aware of the SGTs associated with each of the VMs in the DVS, ingress filtering may be applied to traffic within the domain of the single DVS to reduce load on the network. For traffic with destinations outside the domain of the DVS egress filtering may be used.

In other example embodiments, ingress filtering according to the example embodiments may be implemented in combination with hardware based egress filtering to provide reduced load on a network and provide more efficiency in traffic flow. When a data packet traffic flow is received at an ingress virtual Ethernet module with a destination that is within the domain of the distributed virtual access layer switch in which the ingress virtual Ethernet module is implemented, the ingress filtering may be performed using the security group tag obtained from the virtual supervisor module or TSE. When a data packet flow is received at an ingress virtual Ethernet module with a destination outside the domain of the distributed access layer switch, egress filtering may be performed.

Referring now to FIG. 3B, therein is a simplified flow diagram illustrating example operations that may be associated with a process 310 in an ingress section of a system in accordance with an embodiment of the disclosure. FIG. 3B illustrates a process showing how ingress and egress filtering co-exist within system 200. The process begins at 312 when the first data packet of a new data traffic flow is received at ingress VEM 26(1). At 316 VEM 26(1) forwards the first data packet of the flow to VSM 220. If the destination of the first packet in the data traffic flow is within DVS 200, VSM 220 determines the SGT of the source, determines the destination SGT from the VSM databases, and then determines the RBACL for destination SGT. If the destination of the first packet in the data traffic flow is not within DVS 200, the destination will be unknown to VSM 220. VSM 220 then sends the SGT/RBACL information or a response indicating that VSM 220 does not have the SGT/RBACL information for the destination (i.e., destination unknown) of the packet data flow back to VEM 26(1). At 318 VEM 26(1) receives the SGT/RBACL information or the destination unknown response for the new data traffic flow from VSM 220. At 319, if the SGT/RBACL information was received from VSM 220 the process moves to 320. At 320 VEM 26(1) applies ingress filtering to data packets of the new data traffic flow using the SGT/RBACL information received from the VSM 220. If, however, the destination unknown response was received from VMS 220 at 318, at 319 the process moves to 322 and egress filtering will be applied on the end host at the egress of system 200.

Figure 5A:
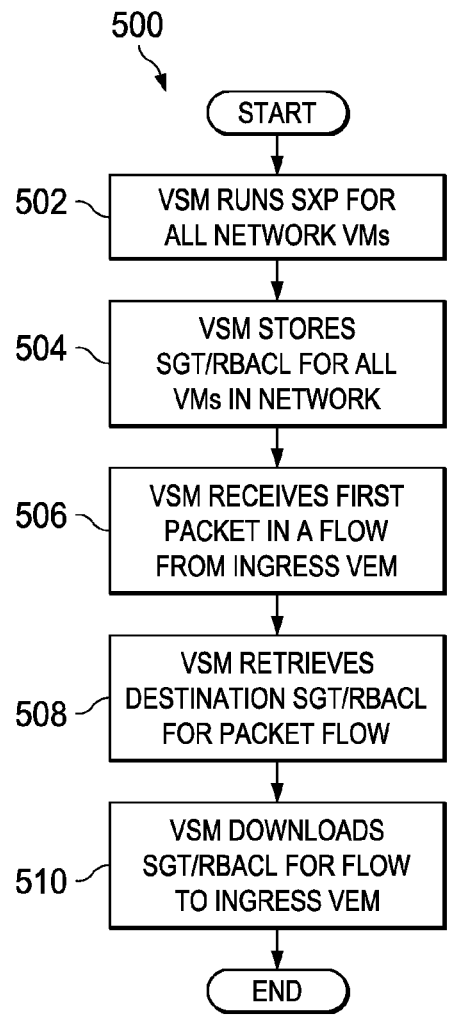
FIG. 5A is a simplified flow diagram illustrating example operations that may be associated with a process in a virtual supervisor module in accordance with an embodiment of the disclosure.

Referring now to FIG. 5A, therein is a simplified flow diagram illustrating example operations that may be associated with a process in a virtual supervisor module (VSM) in accordance with an embodiment of the disclosure. FIG. 5A illustrates VSM operations and interactions with an ingress VEM. FIG. 5A may be explained with reference to the system of FIG. 2A using VMS 220 as an example VSM and VEM 26(1) as an example VEM. At 502 VSM 220 runs the SXP protocol to obtain the SGTs for all network VMs. In the system of FIG. 2A this would be for all VMs on the servers 202(1) through 202(n) that are controlled by the distributed virtual switch (DVS) on which the network is implemented. At 504 VSM 220 stores the SGTs and RBACLs for each of the SGTs within VSM 220. When VEM 26(1), acting as an ingress VEM, receives a first data packet in a data packet flow and forwards the data packet to VSM 220, VSM 220 receives the data packet at 506. At 508 VSM 220 determines the destination SGT for the data packet flow and retrieves the RBACL information associated with the destination SGT of the data packet flow. At 510 VSM 220 downloads the destination SGT and associated RBACL information to VEM 26(1). VEM 26(1) applies ingress filtering to the data packet flow through the operations of 308 of FIG. 3A and operations 408, 410, 412, 414 and 416 of FIG. 4A.

In an alternative example embodiment the centralized services control function may be implemented in a trusted services engine that maintains the security group tags of the network. When the first packet of a data flow is received in a network at an ingress switch function, the ingress switch obtains access control information associated with the data packet flow from the trusted services engine and performs ingress filtering based on the access control information. The ingress switch may obtain the access control information by forwarding the first data packet to the trusted services engine. When the first packet of a data flow is received in a network at an ingress virtual Ethernet module the first packet may be sent to the trusted services engine. The trusted services engine may then determine the destination security group tag and the role based access control list policy associated with the security group tag. The trusted services engine may download the information to the ingress virtual Ethernet module for use in ingress filtering. Additionally, the example embodiment may be scaled using load balancing to add and remove additional trusted service engines to service ingress filtering in the network as load demand for ingress filtering increases or decreases. The trusted services engine may be implemented into the virtual switch infrastructure as a virtual machine and maintain the security group tags and role based access control lists for the network by running the SXP protocol on the network or downloading the security group tags from an identity services engine (ISE) that is used for egress access filtering.

Figure 5B:
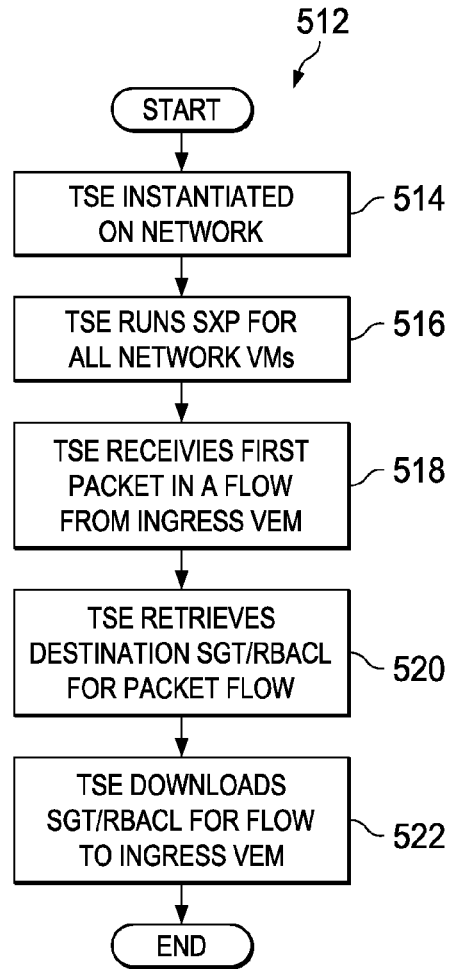
FIG. 5B is a simplified flow diagram illustrating example operations that may be associated with a process in a Trusted Service Engine accordance with an embodiment of the disclosure.

For example, in an alternative embodiment of FIG. 2A, a TSE that stored destination SGTs and associated RBACLs may be implemented in a VM, such as VM 27(1). In this embodiment stored SGTs/RBACLs 260 would be stored in VM 21(7) instead of VSM 220. The processes followed by an ingress VEM according to this embodiment may be implemented similar to FIGS. 3A, 3B and 4, with the VSM replaced with the TSE in VM 21(7). The processes of the interaction of the TSE with the ingress VEM in this embodiment may be implemented as in FIG. 3B Referring now to FIG. 5B, therein is a simplified flow diagram 512 illustrating example operations that may be associated with a process utilizing a central services engine for ingress filtering implemented in a trusted security engine (TSE) in accordance with an embodiment of the disclosure. FIG. 5B illustrates TSE operations and interactions with an ingress VEM. FIG. 5B may be explained with reference to the system of FIG. 2A using an example of a TSE that may be implemented in a VM of system 200. For descriptive purposes, an example illustrating a TSE for ingress filtering implemented in VM 21(7) and using VEM 26(1) as a example ingress VEM will be described. At 514 the TSE is instantiated on system 200. This maybe done by a security/server team that manages the various VMs, security policies and VSNs, e.g., virtual firewalls using service profile that encompasses security policies in system 200. At 516 TSE runs the SXP protocol to obtain the SGTs for all network VMs. In the system of FIG. 2A this would be for all VMs on the servers 202(1) through 202(n) that are controlled by the distributed virtual switch (DVS) on which the network is implemented. At 518 the TSE stores the SGTs and RBACLs for each of the SGTs within the TSE implemented in VM 21(7). When a VEM, for example VEM 26(1), acting as an ingress VEM, receives a first data packet in a data packet flow and forwards the data packet to TSE/VM21(7) the TSE receives the data packet at 518. At 518 the TSE determines the destination SGT for the data packet flow and retrieves the RBACL information associated with the destination SGT of the data packet flow. At 520 the TSE downloads the destination SGT and associated RBACL information to VEM 26(1). VEM 26(1) then applies ingress filtering to the data packet flow through operations similar to the operations of 308 of FIG. 3A and operations 408, 410, 412, 414 and 416 of FIG. 4A with the TSE in place of the VSM.

If the embodiment of FIG. 5B is deployed on a large scale in systems with a large number of ingress switching functions, such as the VEMs of FIG. 2A, it may be necessary to provide an implementation that allows for scaling the TSE resources. The scaling could be used to account for traffic burst scenarios at the ingress switching functions of a system. One implementation that accomplishes this would be to have more than one TSE servicing a single network such as network 200 of FIG. 2A. In this implementation each host may be assigned a TSE to contact through being assigned a TSE by VSM 220/VNMC 240 in a host profile configuration. Another implementation would be to provide a scalable TSE configuration. In this scalable configuration a traffic load balancer may be configured in the system and depending upon traffic load, one or more TSE could be dynamically configured.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Note also that an 'application' as used herein this Specification, can be inclusive of an executable file comprising instructions that can be understood and processed on a computer, and may further include library modules loaded during execution, object files, system files, hardware logic, software logic, or any other executable modules.

In example implementations, at least some portions of the activities outlined herein may be implemented in software. In some embodiments, one or more of these features may be implemented in hardware, provided external to these elements, or consolidated in any appropriate manner to achieve the intended functionality. The various network elements may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, the embodiments may also include suitable interfaces for receiving, transmitting, and/or otherwise communicating data or information in a network environment. Additionally, some of the processors and memory elements associated with the various nodes may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements can store data used for the operations described herein. This includes the memory element being able to store instructions (e.g., software, logic, code, etc.) in non-transitory media, such that the instructions are executed to carry out the activities described in this Specification. A processor can execute any type of instructions associated with the data to achieve the operations detailed herein in this Specification. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

These devices may further keep information in any suitable type of non-transitory storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in communication system 10 could be provided in any database, register, table, cache, queue, control list, or storage structure, based on particular needs and implementations, all of which could be referenced in any suitable timeframe. Any of the memory items discussed herein should be construed as being encompassed within the broad term 'memory element.' Similarly, any of the potential processing elements, modules, and machines described in this Specification should be construed as being encompassed within the broad term 'processor.'

It is also important to note that the operations described with reference to the preceding FIGURES illustrate only some of the possible scenarios that may be executed by, or within, the system. Some of these operations may be deleted or removed where appropriate, or may be changed, modified or changed considerably without departing from the scope of the discussed concepts. In addition, the timing of these operations relative to one another may be altered considerably and the results taught in this disclosure may still be achieved. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. Moreover, although communication system 100 has been illustrated with reference to particular elements and operations that facilitate the communication process, these elements, and operations may be replaced by any suitable architecture or process that achieves the intended functionality of communication system 100.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method for ingress filtering in a network, comprising:
    receiving a plurality of data packets at an ingress switch function, the data packets comprising a data packet flow;
    forwarding a first one of the received data packets to a centralized service engine wherein upon receipt of the first one of the received data packets, the centralized service engine accesses a database to determine a Security Group Tag ("SGT") associated with a destination of the received first data packet and determines access control information associated with the destination SGT;
    downloading access control information from the centralized service engine to the ingress switch function; and
    performing access filtering on the data packet flow at the ingress switch function using the access control information without forwarding additional ones of the data packets to the centralized service engine;
    wherein the ingress switch function is implemented in an access layer switch controlling a plurality of virtual machines, and wherein one of the virtual machines comprises the destination, the method further comprising:
        executing Security Group Exchange Protocol ("SXP") at the centralized service engine to obtain security group tag ("SGT") information for each of the virtual machines; and
        for each of the plurality of virtual machines, storing SGT information for the virtual machine in association with the access control information for the virtual machine in the database at the centralized service engine.

2. The method of claim 1, wherein the access control information includes a security group tag and role based access control list information for the destination of the data packet flow.

3. The method of claim 1, further comprising:
initiating a timer in response to receiving at least one parameter from the centralized service engine at the ingress switch function; and
requesting an update of the at least one parameter from the centralized service engine.

4. The method of claim 1, further comprising:
initiating a timer upon predetermined criteria being met; and
removing the at least one parameter from storage in the ingress switch function.

5. The method of claim 1, wherein the centralized service engine comprises a virtual service module.

6. The method of claim 1, wherein the centralized service engine comprises a trust security engine.

7. The method of claim 1, the wherein ingress switch function comprises a virtual Ethernet module.

8. The method of claim 1, further comprising:
monitoring data traffic load in the network; and
instantiating a second centralized service engine in response to the data traffic load exceeding a predetermined amount.

9. An apparatus, comprising:
one or more processors configured to implement a switching function in a network, the apparatus being configured to:
receive a plurality of data packets at an ingress switch function, the data packets comprising a data packet flow;
forward a first one of the received data packets to a centralized service engine wherein upon receipt of the first one of the received data packets, the centralized service engine accesses a database to determine a Security Group Tag ("SGT") associated with a destination of the received first data packet and determines access control information associated with the destination SGT;
download access control information from the centralized service engine to the ingress switch function; and
perform access filtering on the data packet flow at the ingress switch function using the access control information without forwarding additional ones of the data packets to the centralized service engine;
wherein the ingress switch function is implemented in an access layer switch controlling a plurality of virtual machines, and wherein one of the virtual machines comprises the destination, the apparatus further configured to:
execute Security Group Exchange Protocol ("SXP") at the centralized service engine to obtain security group tag ("SGT") information for each of the virtual machines; and
for each of the plurality of virtual machines, store SGT information for the virtual machine in association with the access control information for the virtual machine in the database at the centralized service engine.

10. The apparatus of claim 9, wherein the access control information includes a security group tag and role based access control list information for a destination of the data packet flow.

11. The apparatus of claim 9, wherein the apparatus is further configured to:
initiate a timer in response to receiving at least one parameter from the centralized service function at the ingress switch function; and
request an update of the at least one parameter from the centralized service function.

12. The apparatus of claim 9, wherein the apparatus is further configured to:
initiate a timer upon predetermined criteria being met; and
remove the at least one parameter from storage in the ingress switch function.

13. The apparatus of claim 9, wherein the centralized service engine comprises a virtual service module.

14. The apparatus of claim 9, wherein the centralized service engine comprises a trust security engine.

15. The apparatus of claim 9, wherein the switching function comprises a virtual Ethernet module.

16. The apparatus of claim 9, wherein the apparatus is further configured for:
monitoring data traffic load in the network; and
initiating a second centralized service engine in response to the data traffic load exceeding a predetermined amount.

17. Non-transitory media encoded in logic that includes instructions for execution and when executed by a processor, is operable to perform operations comprising:
receiving a plurality of data packets at an ingress switch function, the data packets comprising a data packet flow;
forwarding a first one of the received data packets to a centralized service engine wherein upon receipt of the first one of the received data packets, the centralized service engine accesses a database to determine a Security Group Tag ("SGT") associated with a destination of the received first data packet and determines the access control information associated with the destination SGT;
downloading access control information from the centralized service engine to the ingress switch function; and
performing access filtering on the data packet flow at the ingress switch function using the access control information without forwarding additional ones of the data packets to the centralized service engine;
wherein the ingress switch function is implemented in an access layer switch controlling a plurality of virtual machines, and wherein one of the virtual machines comprises the destination, the operations further comprising:
executing Security Group Exchange Protocol ("SXP") at the centralized service engine to obtain security group tag ("SGT") information for each of the virtual machines; and
for each of the plurality of virtual machines, storing SGT information for the virtual machine in association with the access control information for the virtual machine in the database at the centralized service engine.

18. The media of claim 17, wherein the access control information includes a security group tag and role based access control list information for the destination of the data packet flow.

* * * * *